(12) United States Patent
Dueck et al.

(10) Patent No.: US 12,547,790 B2
(45) Date of Patent: Feb. 10, 2026

(54) FIREARM SOUND SUPPRESSOR WITH PERIPHERAL VENTING

(71) Applicant: SureFire, LLC, Fountain Valley, CA (US)

(72) Inventors: Barry William Dueck, Fountain Valley, CA (US); Michael Standen, Fountain Valley, CA (US); Eric Hung Leung Chow, Fountain Valley, CA (US); Ryan Steven Glasby, Fountain Valley, CA (US); Douglas Lawrence Stefanski, Fountain Valley, CA (US)

(73) Assignee: Surefire, LLC, Fountain Valley, CA (US)

( * ) Notice: Subject to any disclaimer, the term of this patent is extended or adjusted under 35 U.S.C. 154(b) by 814 days.

(21) Appl. No.: 17/948,667

(22) Filed: Sep. 20, 2022

(65) Prior Publication Data

US 2023/0021170 A1    Jan. 19, 2023

Related U.S. Application Data

(63) Continuation-in-part of application No. 17/681,246, filed on Feb. 25, 2022.

(60) Provisional application No. 63/154,564, filed on Feb. 26, 2021.

(51) Int. Cl.
| | |
|---|---|
| *G06F 30/17* | (2020.01) |
| *G06F 30/20* | (2020.01) |
| *F41A 21/30* | (2006.01) |
| *F41A 21/34* | (2006.01) |

(52) U.S. Cl.
CPC .............. *G06F 30/17* (2020.01); *G06F 30/20* (2020.01); *F41A 21/30* (2013.01); *F41A 21/34* (2013.01)

(58) Field of Classification Search
CPC .......... G06F 30/17; G06F 30/20; G06F 30/28; F41A 21/30; F41A 21/34
See application file for complete search history.

(56) References Cited

PUBLICATIONS

Lo SW, Tai CH, Teng JT. Axial-Symmetry Numerical Approaches for Noise Predicting and Attenuating of Rifle Shooting with Suppressors. Journal of Applied Mathematics. 2011;2011(1):961457. (Year: 2011).*

(Continued)

*Primary Examiner* — Chuen-Meei Gan
(74) *Attorney, Agent, or Firm* — Rutan & Tucker LLP; Hani Z. Sayed

(57) ABSTRACT

An apparatus and methods are provided for a suppressor to be coupled with a muzzle end of a barrel of a firearm to reduce muzzle blast and muzzle flash. The suppressor comprises a housing having a proximal end and a distal end. A front portion within the housing comprises a series of cylindrical gas expansion chambers for attenuating the temperature and energy of propellant gases accompanying a projectile fired from the firearm. An annular gas expansion chamber surrounds the cylindrical gas expansion chambers and directs a portion of the propellant gases from a rear portion of the suppressor to peripheral vents disposed at the distal end. Lateral chambers within the rear portion deflect and rebound a portion of the propellant gases before passing them into the annular gas expansion chamber. Ledges within the annular gas expansion chamber direct the propellant gases distally through suppressor toward the peripheral vents.

15 Claims, 9 Drawing Sheets

(56) References Cited

PUBLICATIONS

Selech, Jaroslaw, et al. "Force and sound pressure sensors used for modeling the impact of the firearm with a suppressor." Applied Sciences 10.3 (2020): 961. (Year: 2020).*

Volkov, K. N., et al. "Simulation of nonstationary turbulent flows in devices for reducing the noise level of high-pressure gas media moving with a high velocity." Journal of Engineering Physics and Thermophysics 94.6 (2021): 1484-1493. (Year: 2021).*

Bin, Jonghoon, Minwoo Kim, and Soogab Lee. "A numerical study on the generation of impulsive noise by complex flows discharging from a muzzle." International journal for numerical methods in engineering 75.8 (2008): 964-991. (Year: 2008).*

* cited by examiner

FIREARM SOUND SUPPRESSOR WITH PERIPHERAL VENTING

PRIORITY

This application is a continuation-in-part of, and claims the benefit of, U.S. Patent Application, entitled "Firearm Sound Suppressor With Peripheral Venting," filed on Feb. 25, 2022, and having application Ser. No. 17/681,246, which claims the benefit of and priority to U.S. Provisional Application filed on Feb. 26, 2021 and having application Ser. No. 63/154,564, the entirety of each of said applications being incorporated herein by reference.

FIELD

Embodiments of the present disclosure generally relate to firearms. More specifically, embodiments of the disclosure relate to an apparatus and methods for a noise and flash suppressor for firearms that exhibits a relatively low back pressure to reduce toxic fumes that may be inhaled during firing a weapon.

BACKGROUND

Firearms, such as pistols and rifles, generally utilize expanding high-pressure gases generated by a burning propellant to expel a projectile from the weapon at a relatively high velocity. When the projectile, or bullet, exits a muzzle end of the weapon's barrel, a bright, "muzzle flash" of light and a high-pressure pulse of combustion gases accompany the bullet. The rapid pressurization and subsequent depressurization caused by the high-pressure pulse gives rise to a loud sound known as "muzzle blast," which, like muzzle flash, can readily indicate to a remote enemy both the location of the weapon and the direction from which it is being fired. In some situations, such as covert military operations, it is highly desirable to conceal this information from the enemy by suppressing the muzzle flash and/or substantially reducing the amplitude of the muzzle blast.

The muzzle blasts of firearms may be reduced by using sound suppressors, such as "noise suppressors" and "silencers." Suppressors generally reduce muzzle blast by reducing and controlling the energy level of propellant gases accompanying a projectile as it exits the muzzle end of the weapon. Suppressors typically comprise an elongated tubular housing containing a series of baffles that define a plurality of successive internal chambers. The internal chambers control, delay, and divert the flow, expansion, and exit of the propellant gases. The internal chambers further serve to reduce the temperature of the propellant gases so as to cause a corresponding reduction in the noise produced by the propellant gases as they ultimately exit the suppressor. A rear portion of a typical suppressor may include a mechanism for removably attaching the suppressor to a firearm, and a front portion generally includes an opening for the exit of projectiles. Further, the front portion of suppressors typically are located sufficiently forward of the muzzle end of firearms to effectively reduce flash.

In some embodiments, suppressors are configured to reduce the temperature and pressure of propellant gases by introducing the gases into a succession of expansion chambers so as to give rise to a controlled expansion of the gases. In other embodiments, however, suppressors may be of a "multi-stage" variety that is configured to divert a portion of the propellant gases through a plurality of radial vents to one or more un-baffled, radially disposed "blast suppressor" chambers before being introduced into the succession of expansion chambers. Although multi-stage suppressors are relatively more complex to implement, they generally provide more opportunities to delay and cool the propellant gases, and hence, to reduce muzzle blast sound levels overall.

Existing suppressors have certain drawbacks that generally hinder their operation and/or efficiency. For example, one drawback to existing suppressors is that with extended use, particulate contaminates comprising propellant gases condense and are deposited on interior surfaces, such as the surfaces of the baffles, of the suppressors. These deposits include carbon from burnt propellant, lead from projectiles, and in the case of the use of "jacketed" projectiles, copper, Teflon, and/or molybdenum disulfide. While these deposits can usually be cleaned away with suitable solvents, they are typically hard and adhesive in nature, making it difficult or impossible to effectively clean the suppressor without damaging its parts.

Another drawback to existing multi-stage suppressors is that conventional sound and flash suppression generally causes higher back pressures within the suppressors. Higher back pressure is known to expose an operator of a weapon to toxic fumes arising due to firing the weapon. As such, a potential risk to the health of the operator grows in direct proportion to the amount of time spent using the weapon.

Another drawback to existing multi-stage suppressors is that the blast suppressor chambers generally experience substantially greater radial pressures and temperatures than the succession of baffled expansion chambers. The difference in pressure and temperature does not ordinarily present a problem during intermittent firing of a weapon, wherein sufficient time passes between rounds to allow the pressure and temperature within the suppressor to abate. During a relatively high rate of fire, such as sustained fully automatic fire, the difference in pressure and temperature may cause the outer tubular housing of the suppressor to fail prematurely. In some instances, the outer tubular housing may "blow out" due to sustained local pressures and temperatures during fully automatic firing of the weapon.

Still another problem with existing suppressors pertains to their ability to effectively suppress muzzle flash. Many existing suppressors are known to exhibit a relatively large muzzle flash when a first round is fired through the suppressor, such as when the weapon has not been recently fired. Immediately subsequent rounds, however, typically do not exhibit this relatively large muzzle flash.

Given the above-mentioned drawbacks to existing suppressors, there is a desire to develop a firearm sound suppressor that exhibits a relatively low back pressure, thereby reducing toxic fumes inhaled by a practitioner during firing a weapon, while effectively suppressing sound and flash due to firing the weapon.

SUMMARY

An apparatus and methods are provided for a suppressor to be coupled with a muzzle end of a barrel of a firearm to reduce muzzle blast and muzzle flash. The suppressor comprises a housing having a proximal end and a distal end. A front portion within the housing comprises a series of cylindrical gas expansion chambers for attenuating the temperature and energy of propellant gases. An annular gas expansion chamber surrounds the series of cylindrical gas expansion chambers and is configured to direct a portion of the propellant gases from a rear portion of the suppressor to peripheral vents disposed at the distal end. The rear portion comprises multiple lateral chambers for deflecting and rebounding a portion of the propellant gases before passing the propellant gases into the annular gas expansion chamber. Circumferential apertures disposed between the cylindrical gas expansion chambers and the annular gas expansion chamber are configured to direct a portion of the propellant gases from the series of cylindrical gas expansion chambers into the annular gas expansion chamber. Ledges are disposed on an exterior of the series of cylindrical gas expansion chambers and configured to direct the propellant gases distally through the annular gas expansion chamber toward the peripheral vents. The annular gas expansion chamber comprises a continuous chamber that spans a portion of the length of the suppressor and opens to the peripheral vents.

In an exemplary embodiment, a suppressor for coupling with a muzzle end of a barrel of a firearm for reducing muzzle blast and eliminating muzzle flash comprises: a housing having a proximal end and a distal end; a front portion within the housing comprising a series of cylindrical gas expansion chambers for attenuating the temperature and energy of propellant gases; an annular gas expansion chamber surrounding the series of cylindrical gas expansion chambers for directing a portion of the propellant gases to peripheral vents disposed at the distal end; and a rear portion comprising multiple lateral chambers for deflecting and rebounding a portion of the propellant gases before entering the annular gas expansion chamber.

In another exemplary embodiment, the proximal end is adapted to couple the suppressor to the muzzle end by way of a suitable retaining mechanism or other suitable device. In another exemplary embodiment, the distal end comprises: a front plate; a central bore adapted to provide an exit to a projectile fired from the firearm; and the series of peripheral vents disposed between the front plate and the housing for releasing propellant gases.

In another exemplary embodiment, the front portion includes a series of baffles that are separated from one another by cylindrical spacers. In another exemplary embodiment, the cylindrical spacers are coaxially disposed within the front portion such that a central aperture comprising each of the baffles is coaxially aligned with a central bore comprising the distal end. In another exemplary embodiment, baffles near the rear portion include a blast baffle and are relatively thicker than other baffles within the front portion so as to withstand the pressure and temperature of propellant gases exiting the rear portion. In another exemplary embodiment, pairs of adjacent baffles and intervening cylindrical spacers generally define the cylindrical gas expansion chambers. In another exemplary embodiment, the series of cylindrical gas expansion chambers are configured to reduce the temperature of the propellant gases.

In another exemplary embodiment, one or more circumferential apertures are disposed between the cylindrical gas expansion chambers and the annular gas expansion chamber. In another exemplary embodiment, the one or more circumferential apertures are configured to direct the propellant gases from the cylindrical gas expansion chambers into the annular gas expansion chamber.

In another exemplary embodiment, the annular gas expansion chamber comprises a continuous chamber that spans a portion of the length of the suppressor and opens to the peripheral vents. In another exemplary embodiment, the portion of the length of the suppressor comprises a majority of the length of the suppressor. In another exemplary embodiment, one or more cylindrical spacers comprising the series of cylindrical gas expansion chambers include an exterior ledge configured for directing the propellant gases toward the peripheral vents. In another exemplary embodiment, the exterior ledge extends circumferentially around an exterior of a cylindrical spacer and includes a sloped surface and an acutely angled surface. In another exemplary embodiment, the exterior ledges are configured to keep the propellant gases flowing distally through the annular gas expansion chamber until exiting the peripheral vents. In another exemplary embodiment, the sloped surface is configured to offer little resistance to the propellant gases flowing in a distal direction while the acutely angled surface is configured to offer a relatively greater resistance to the propellant gases flowing in a proximal direction toward the rear portion.

In another exemplary embodiment, the rear portion comprises a firearm attachment that includes a central bore and three long tines that extend into a back end member. In another exemplary embodiment, a lateral gas expansion chamber is disposed between a portion of the long tines and the back end member and is adapted to divert and allow for expansion of a portion of the propellant gases entering the through the central bore. In another exemplary embodiment, curved interior surfaces of the back end member forward of the long tines define a primary gas expansion chamber. In another exemplary embodiment, the curved interior surfaces are adapted to deflect a portion of the propellant gases toward one or more vents disposed at a rear of the primary gas expansion chamber. In another exemplary embodiment, the one or more vents are configured to allow the portion of the deflected propellant gases to exit the primary gas expansion chamber and enter a blast suppression chamber. In another exemplary embodiment, the blast suppression chamber is disposed between a tapered blast deflector and a portion of the back end member that surrounds the lateral gas expansion chamber. In another exemplary embodiment, a rear portion of the blast suppression chamber exits into a rear-most portion of the annular gas expansion chamber such that the portion of the deflected propellant gases travel around the tapered blast deflector before entering the annular gas expansion chamber and exiting through the peripheral vents.

In an exemplary embodiment, a suppressor for a firearm comprises: a housing having a proximal end and a distal end; a front portion for attenuating the temperature and energy of propellant gases; an annular gas expansion chamber for directing a portion of the propellant gases to peripheral vents disposed at the distal end; and a rear portion for deflecting and rebounding a portion of the propellant gases before entering the annular gas expansion chamber.

In another exemplary embodiment, the front portion includes a series of cylindrical gas expansion chambers for attenuating the temperature and energy of the propellant gases; the annular gas expansion chamber surrounds the series of cylindrical gas expansion chambers; and the rear portion includes multiple lateral chambers for deflecting and rebounding the propellant gases. In another exemplary embodiment, the front portion includes a series of baffles that are separated from one another by cylindrical spacers. In another exemplary embodiment, pairs of adjacent baffles and intervening cylindrical spacers generally define cylindrical gas expansion chambers configured to reduce any of the temperature of the propellant gases, the pressure of the propellant gases, the velocity of the propellant gases, or any combination thereof. In another exemplary embodiment, one or more circumferential apertures are configured to direct propellant gases from the cylindrical gas expansion chambers into the annular gas expansion chamber. In another exemplary embodiment, the annular gas expansion chamber comprises a continuous chamber that extends from the rear portion to the peripheral vents.

In another exemplary embodiment, one or more ledges are disposed within the annular gas expansion chamber for directing propellant gases toward the peripheral vents. In another exemplary embodiment, the one or more ledges are disposed circumferentially around an interior of the annular gas expansion chamber and include a sloped surface and an acutely angled surface. In another exemplary embodiment, the one or more ledges are configured to keep the propellant gases flowing distally through the annular gas expansion chamber until exiting the peripheral vents.

In another exemplary embodiment, the rear portion comprises a firearm attachment that includes a central bore and three long tines that extend into a back end member. In another exemplary embodiment, a lateral gas expansion chamber is disposed between a portion of the long tines and the back end member and is adapted to divert and allow for expansion of a portion of propellant gases entering the through the central bore. In another exemplary embodiment, a primary gas expansion chamber comprises curved interior surfaces of the back end member forward of the long tines.

In another exemplary embodiment, the curved interior surfaces are adapted to deflect a portion of propellant gases toward one or more vents disposed at a rear of the primary gas expansion chamber. In another exemplary embodiment, the primary gas expansion chamber and the vents include one or more ledges for directing propellant gases toward a blast suppression chamber. In another exemplary embodiment, the ledges are disposed along a least a portion of a circumference of the primary gas expansion chamber and the vents.

In another exemplary embodiment, the blast suppression chamber is disposed between a tapered blast deflector and a portion of the back end member that surrounds the lateral gas expansion chamber. In another exemplary embodiment, a rear portion of the blast suppression chamber exits into a rear-most portion of the annular gas expansion chamber such that the portion of the deflected propellant gases travel around the tapered blast deflector before entering the annular gas expansion chamber. In another exemplary embodiment, the tapered blast deflector is configured to inhibit a backflow of propellant gases from the blast suppression chamber into the primary gas expansion chamber.

In an exemplary embodiment, a method for a suppressor for a firearm comprises: forming a housing having a proximal end and a distal end; arranging a front portion for attenuating the temperature and energy of propellant gases; disposing an annular gas expansion chamber around the front portion for directing a portion of the propellant gases to peripheral vents disposed at a distal end; and configuring a rear portion for deflecting and rebounding a portion of the propellant gases before entering the annular gas expansion chamber.

In another exemplary embodiment, disposing the annular gas expansion chamber includes surrounding the front portion with the housing such that the annular gas expansion chamber is disposed between an exterior of the front portion and an interior of the housing.

In another exemplary embodiment, the gas expansion chamber between an exterior of the front portion and an interior of the housing is semi-annular or consisting of a series of passages of some other cross-sectional shape directing a portion of the propellant gases to peripheral vents disposed at a distal end.

In another exemplary embodiment, the annular or otherwise shaped gas expansion chamber comprises more than one chamber in series to provide a path for directing a portion of the propellant gases to peripheral vents disposed at a distal end.

In another exemplary embodiment, the annular or otherwise shaped gas expansion chamber directs a portion of the propellant gases to a cylindrical gas expansion chamber that is in communication with the peripheral vents disposed at a distal end.

In an exemplary embodiment, a method for providing suppressors that couple with firearms for reducing muzzle blast and minimizing muzzle flash comprises: identifying causes of the muzzle flash; categorizing types of muzzle flash exhibited by a suppressor; developing a model of flash behavior; and applying the model to a proposed suppressor.

In another exemplary embodiment, identifying the causes of the muzzle flash includes identifying a combination of primary combustion, secondary combustion, and tertiary combustion as driving flash performance of the suppressor. In another exemplary embodiment, categorizing the types of muzzle flash includes demonstrating suppressor flash performance as comprising any one of first-round flash, steady-state flash, and high-temperature flash. In another exemplary embodiment, developing the model includes dividing a flash plume into a plume component and a hot spot component to generate a prediction of steady-state flash performance of the suppressor. In another exemplary embodiment, applying the model includes applying a formula that relates Mach Threshold as a function of distance from the suppressor to new suppressor configurations to predict flash performance.

In another exemplary embodiment, developing the model includes developing a computation fluid dynamics-based predictive model by comparing composite and time-average imagery with flash photography of the suppressor. In another exemplary embodiment, developing includes comparing empirically collected data to simulated data for the suppressor to create an algorithm that produces predicted flash performance. In another exemplary embodiment, applying the model includes inputting simulation results for the proposed suppressor into the algorithm to produce predicted flash performance for the proposed suppressor.

In another exemplary embodiment, developing the model includes collecting empirical data pertaining to suppressor flash performance. In another exemplary embodiment, collecting includes taking a time lapse image of a flash plume for a first round fired through the suppressor in a cold state. In another exemplary embodiment, collecting includes posterizing the time lapse image in an image processing software and creating two or more levels of plume intensity at even intervals of distance. In another exemplary embodiment, collecting includes subjecting the time lapse image to a computation fluid dynamics-based simulation using conditions derived from a model of combustion.

In another exemplary embodiment, subjecting includes time-averaging the simulation to create images of any one or more of dRho, temperature, and Mach Number. In another exemplary embodiment, collecting includes using the simulation to derive a y-axis width at each x-value for each region of similar Mach Number. In another exemplary embodiment, developing the model includes applying the simulation to the time lapse image of the flash plume to derive the Mach Number that corresponds to the width of the visible plume as a function of distance from the suppressor. In another exemplary embodiment, applying the simulation includes obtaining a resultant data set comprising the Mach Number from the simulation that corresponds to the actual visible plume boundary as a function of distance from the suppressor. In another exemplary embodiment, developing the model includes using the resultant data set to determine a formula that expresses Mach Threshold as a function of distance from the suppressor.

In an exemplary embodiment, a method for providing a suppressor that couples with a firearm and exhibits reduced muzzle blast and minimized muzzle flash comprises: collecting empirical data pertaining to existing suppressor flash performance; developing a model of the existing suppressor flash performance; deriving a formula that expresses Mach Threshold as a function of distance from the existing suppressor; applying the model to a proposed suppressor to predicted suppressor flash performance; altering the proposed suppressor to minimize the predicted suppressor flash performance; and assembling the proposed suppressor having a minimized predicted suppressor flash performance.

In another exemplary embodiment, developing the model includes comparing the collected empirical data to simulated data for the suppressor to create an algorithm that produces predicted flash performance. In another exemplary embodiment, applying the model includes inputting simulation results for the proposed suppressor into the algorithm to produce predicted flash performance for the proposed suppressor.

These and other features of the concepts provided herein may be better understood with reference to the drawings, description, and appended claims.

BRIEF DESCRIPTION OF THE DRAWINGS

The drawings refer to embodiments of the present disclosure in which.

Figure 1:
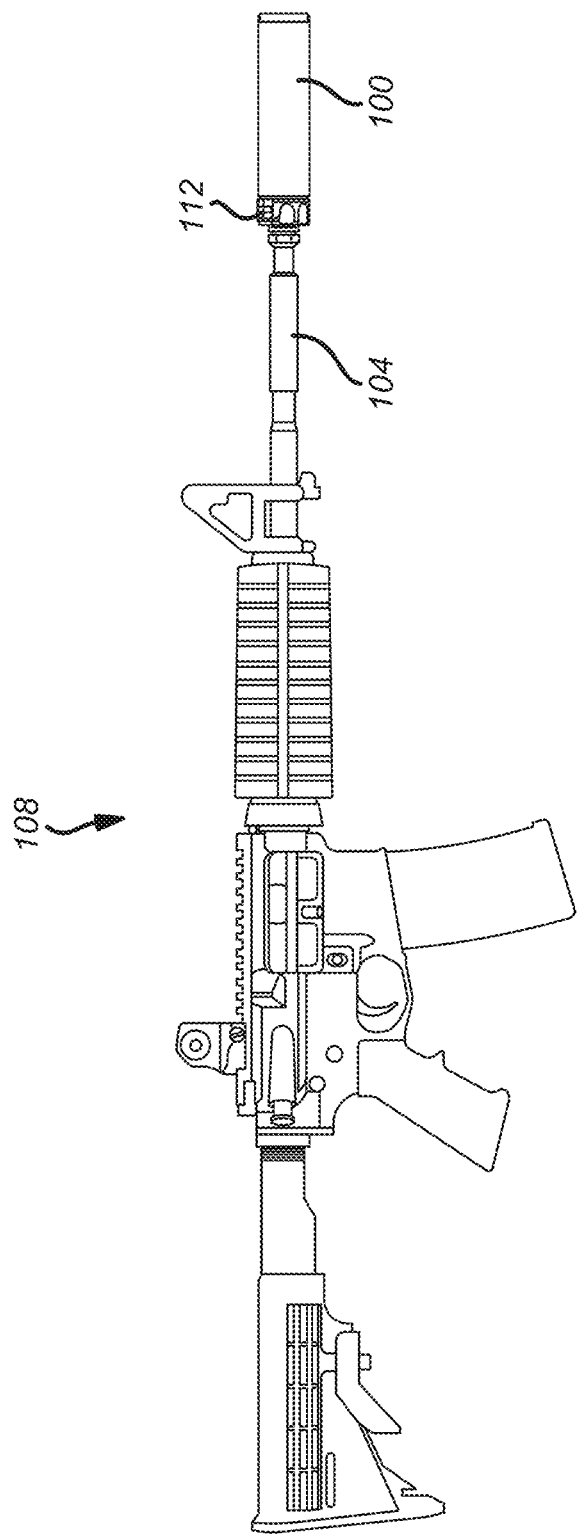
FIG. 1 illustrates a right-side elevation view of an exemplary embodiment of a suppressor coupled to a muzzle end of a barrel of a rifle in accordance with the present disclosure.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the suppressor for firearms and methods disclosed herein may be practiced without these specific details. In other instances, specific numeric references such as "first chamber," may be made. However, the specific numeric reference should not be interpreted as a literal sequential order but rather interpreted that the "first chamber" is different than a "second chamber." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, muzzle blasts of firearms may be reduced by using sound suppressors, such as "noise suppressors" and "silencers." Existing suppressors have certain drawbacks that generally hinder their operation and/or efficiency. One drawback to existing suppressors is that sustained pressure and temperature differentials arising during relatively high rates of fire a weapon may cause the suppressor to prematurely fail due to blowing out an exterior housing comprising the suppressor. Another drawback to existing suppressors is they may exhibit a relatively large muzzle flash when a first round is fired through the suppressor, such as when the weapon has not been recently fired. Another drawback to existing suppressors is their relatively high back pressures generally expose practitioners to toxic fumes that present potential health risks. Embodiments presented herein provide suppressors that exhibit relatively low back pressures, thereby reducing toxic fumes inhaled by practitioners, while effectively minimizing muzzle flash and muzzle blast.

FIG. 1 illustrates a right-side elevation view of an exemplary embodiment of a suppressor 100 coupled to the muzzle end of a barrel 104 of a firearm 108, such as a rifle, in accordance with the present disclosure. In the illustrated embodiment, the suppressor 100 is coupled with the barrel 104 by way of a retaining mechanism 112. For example, such a retaining mechanism may be implemented as described in U.S. Pat. Nos. 6,948,415, 7,676,976, 7,946,069, 8,091,462, and 8,459,406, all of which are incorporated by reference herein in their entirety. It is contemplated, however, that the suppressor 100 may be attached to the barrel 104 by way of any of various suitable devices and/or techniques.

Figure 2:
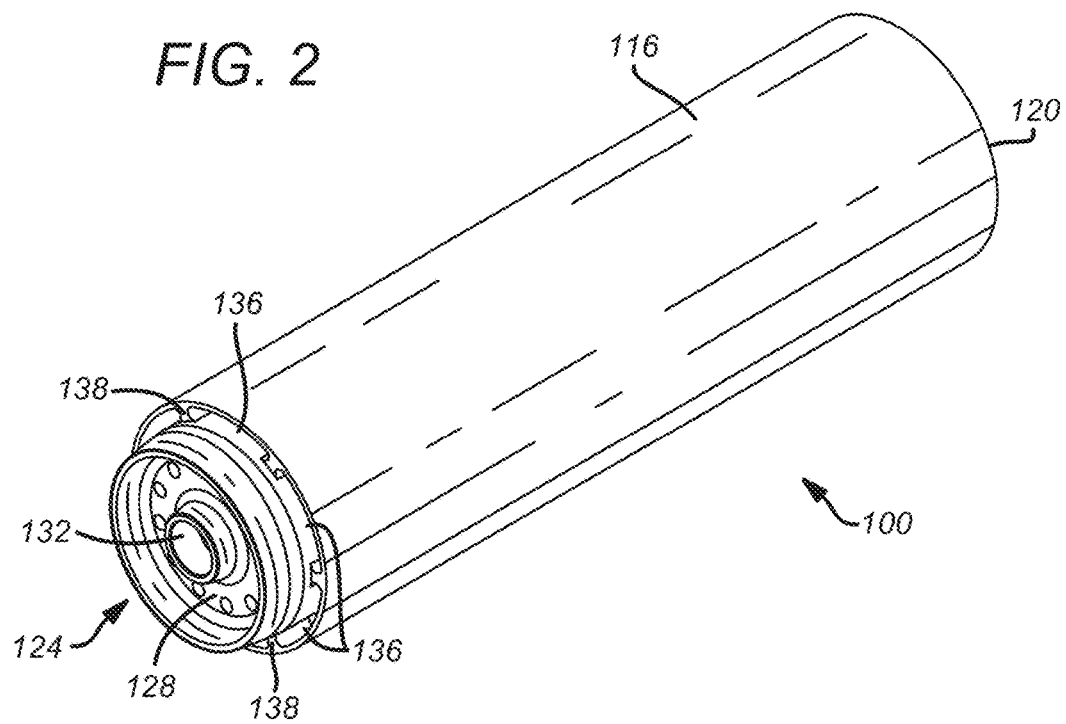
FIG. 2 illustrates a perspective view of an exemplary embodiment of a suppressor that may be coupled to the muzzle end of a barrel of a firearm.

FIG. 2 illustrates a perspective view of an exemplary embodiment of a suppressor 100 that may be coupled to the muzzle end of a barrel 104 of a firearm 108, as shown in FIG. 1. The suppressor 100 is a generally elongate member comprising a housing 116 and having a proximal end 120 and a distal end 124. As will be appreciated, the proximal end 120 is adapted to couple the suppressor 100 to the muzzle end of the barrel 104, such as by way of the above-mentioned retaining mechanism 112 or other suitable device. The distal end 124 comprises a front plate 128, a central bore 132, and a series of peripheral vents 136 disposed between the front plate 128 and the housing 116. In some embodiments, the peripheral vents 136 may be arranged to vent propellant gases in a distal direction or radially outward around the circumference of the housing 116, without limitation. The central bore 132 is adapted to provide an exit to a projectile, or a bullet, fired from the firearm 108 while the peripheral vents 136 are configured to provide an exit to expanding propellant gases accompanying the firing of the projectile. In some embodiments, the central bore 132 may be implemented with a tapered portion and an untapered portion, as described in detail in U.S. Pat. No. 8,505,680, which is incorporated herein by reference in its entirety.

In the embodiment of the suppressor 100 illustrated herein, the housing 116 is shown having a cylindrical shape, or being substantially tubular in nature. It should be understood, however, that the housing 116 is not limited to being cylindrical and/or tubular in shape or having a circular cross-sectional shape. For example, the housing 116 may have a cross-sectional shape comprising any of square, rectangular, oval, and the like, without limitation. Further, the housing 116 may comprise different shapes and sizes along the length of the housing 116. In some embodiments, for example, a first portion of the housing 116 may be tubular while a second portion of the housing 116 may having a non-tubular shape, such as a rectangular shape. Further, in some embodiments, the first portion of the housing 116 may comprise a tube having a first diameter while the second portion may comprise a tube having a second diameter that is larger or smaller than the first diameter. Other suitable configurations of the housing 116 will become apparent to those skilled in the art.

Figure 3:
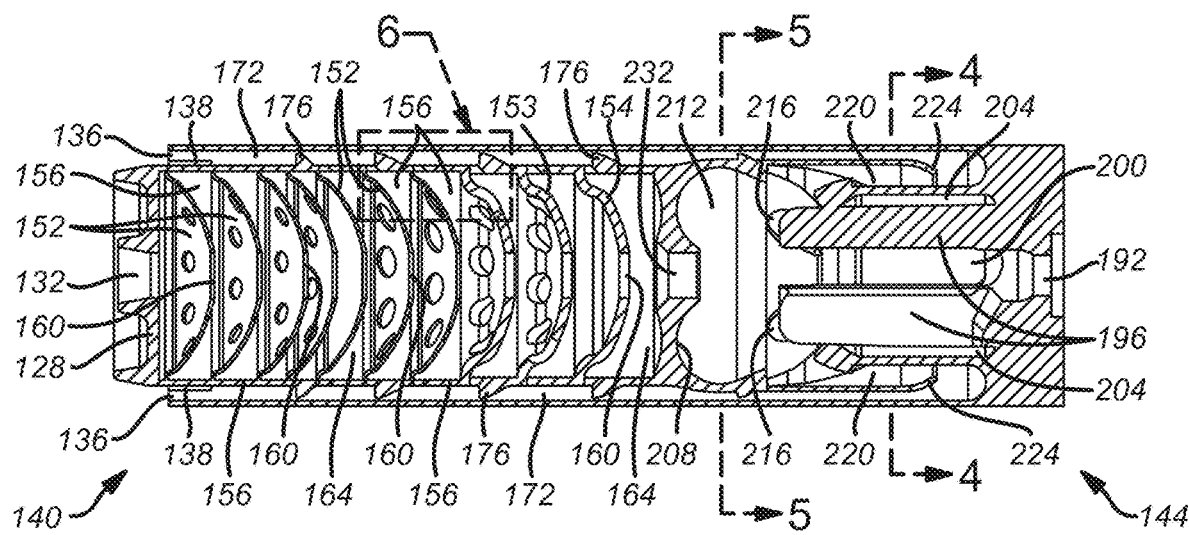
FIG. 3 illustrates a cross-sectional view of the suppressor shown in FIG. 2, taken a long a midline.

FIG. 3 illustrates a cross-sectional view of the suppressor 100 of FIG. 2, taken a long a midline. As will be appreciated, the suppressor 100 generally is of a "multi-stage" variety that is configured to divert a portion of propellant gases through a plurality of lateral blast suppression chambers before mixing the gases with a portion of propellant gases introduced into a succession of expansion chambers, as disclosed in greater detail herein. It is contemplated that, in some embodiments, the suppressor 100 may comprise a multiplicity of components that may be assembled, such as by way of laser welding as detailed in U.S. Pat. No. 10,088,259, which is incorporated herein by reference in its entirety. In some embodiments, however, the suppressor 100 may be monolithic in nature, and thus the suppressor 100 may be formed by way of 3D printing or other similar techniques, without limitation.

The interior of the suppressor 100 may be broadly separated into a front portion 140 and a rear portion 144. The front portion 140 comprises a series of baffles 152 that are separated from one another by cylindrical spacers 156 of various suitable sizes. The cylindrical spacers 156 are coaxially disposed within the front portion 140 such that a central aperture 160 comprising each of the baffles 152 is coaxially aligned with the central bore 132. Baffles 153 and 154 near the rear portion 144, including a blast baffle 208, are relatively thicker than other baffles 152 within the front portion 140 so as to withstand the pressure and temperature of propellant gases exiting the rear portion 144. As will be appreciated, each pair of adjacent baffles 152 and the intervening cylindrical spacer 156 generally defines a cylindrical gas expansion chamber 164. As such, the front portion 140 includes a longitudinally stacked series of cylindrical gas expansion chambers 164 that are configured to control, delay, and divert the flow, expansion, and exhausting of the propellant gases, as well as to reduce their temperature.

Figure 6:
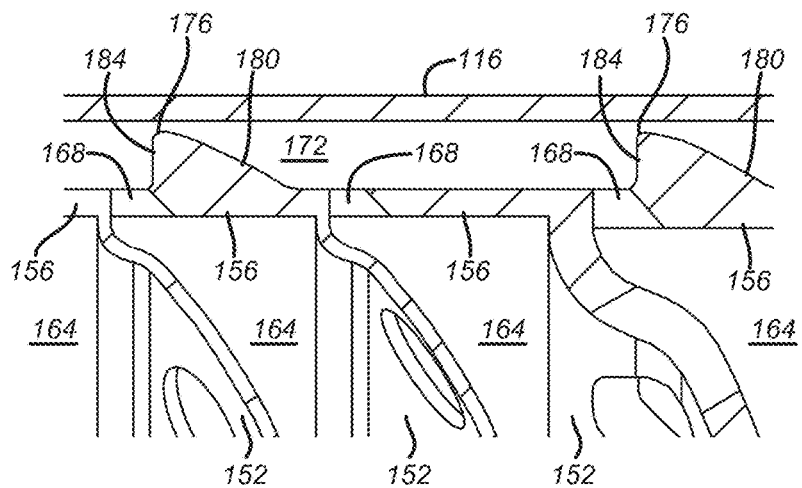
FIG. 6 illustrates a close-up view of baffles and circumferential apertures comprising the suppressor shown in FIG. 3.

As best shown in FIG. 6, one or more circumferential apertures 168 may be disposed between the cylindrical gas expansion chambers 164 and an annular gas expansion chamber 172 that is disposed between an outside surface of the spacers 156 and an inner surface of the housing 116. The circumferential apertures 168 may be formed in any of a front end, a rear end, or both the front and rear ends of the spacers 156, such that when an end of a spacer 156 is abutted against an opposing end of an adjacent baffle 152, a radial opening or vent is established between and the abutting ends. Additional details pertaining to the circumferential apertures 168 are provided in U.S. Pat. No. 10,088,259 which is incorporated herein by reference in its entirety.

The circumferential apertures 168 are configured to direct propellant gases in a radial direction from the cylindrical gas expansion chambers 164 into the annular gas expansion chamber 172 surrounding the spacers 152. As shown in FIG. 3, the annular gas expansion chamber 172 comprises a continuous chamber that spans a portion of the length of the suppressor 100 and opens to the peripheral vents 136. As such, the housing 116 is supported by mounts 138 disposed at the distal end 124 of the suppressor 100. As shown in FIGS. 3 and 6, one or more of the cylindrical spacers 156 may include an exterior ledge 176 configured to direct the propellant gases toward the peripheral vents 136. The exterior ledge 176 generally extends circumferentially around the exterior of the cylindrical spacer 156 and includes a sloped surface 180 and an acutely angled surface 184. The sloped surface 180 is configured to offer little resistance to propellant gases passing over the ledge 176 in a distal direction while the acutely angled surface 184 is configured to offer a relatively greater resistance to propellant gases flowing proximally toward the rear portion 144 of the suppressor 100. Thus, the exterior ledges 176 serve to keep the propellant gases flowing distally through the annular gas expansion chamber 172 until ultimately exiting the suppressor 100 through the peripheral vents 136.

It is contemplated that, in some embodiments, any one or more of the ledges 176 may be disposed on an inner surface of the housing 116, in lieu of extending along the exterior of the cylindrical spacers 156. As will be appreciated, ledges 176 disposed on the inner surface of the housing 116 may include a sloped surface and an acutely angled surface that are substantially similar to the surfaces 180, 184 described above. As such, the sloped and acutely angled surfaces comprising the ledges 176 disposed inside the housing 116 are configured to encourage the propellant gases flowing distally through the annular gas expansion chamber 172.

Figure 4:
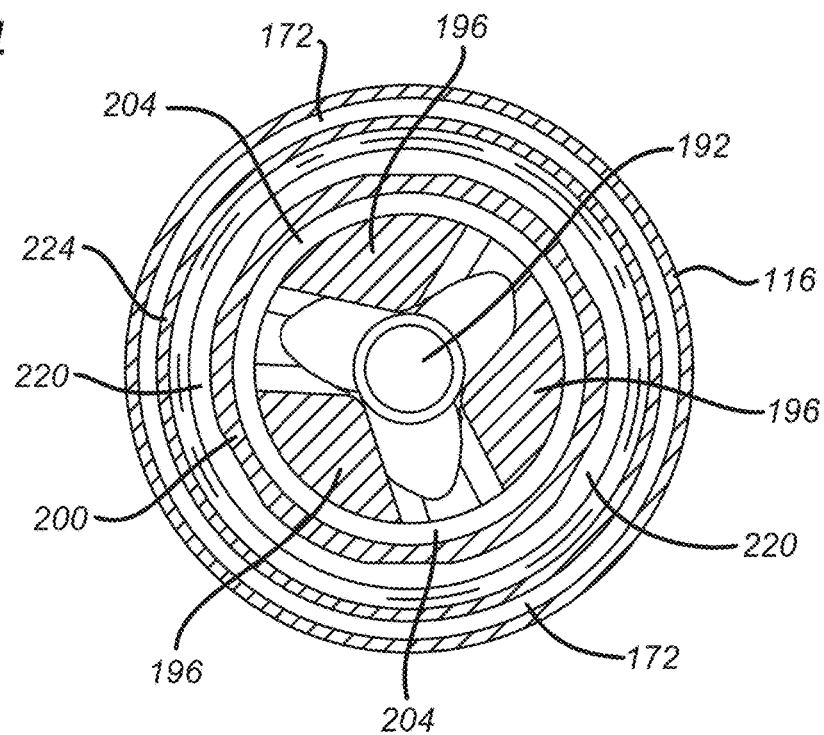
FIG. 4 illustrates a cross-sectional view of the suppressor shown in FIG. 3, taken along a line 4-4.

Turning, again, to FIG. 3, the rear portion 144 of the suppressor 100 comprises a firearm attachment 188 that includes a central bore 192 and three long tines 196 that extend into a back end member 200. As shown in FIG. 4, a lateral gas expansion chamber 204 is disposed between a portion of the long tines 196 and the back end member 200. The lateral gas expansion chamber 204 is adapted to divert a portion of the propellant gases entering the suppressor 100 through the central bore 192 and allow for expansion of the propellant gases.

Figure 5:
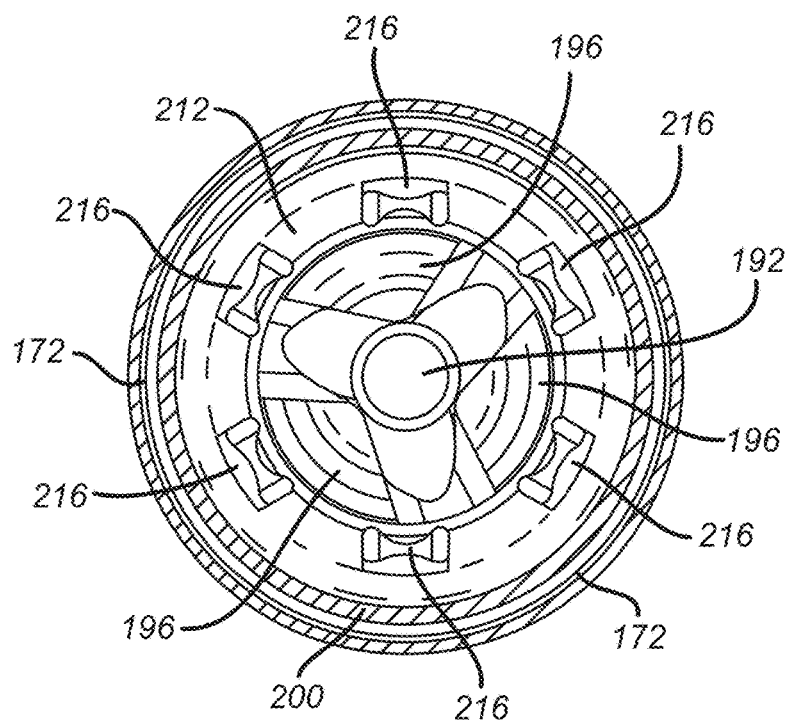
FIG. 5 illustrates a cross-sectional view of the suppressor shown in FIG. 3, taken along a line 5-5.

As shown in FIG. 3, the back end member 200 includes curved interior surfaces 208 forward of the long tines 196 that define a primary gas expansion chamber 212. The curved interior surfaces 208 are adapted to deflect a portion of the propellant gases accompanying a fired bullet toward a rear of the primary gas expansion chamber 212. Multiple vents 216 at the rear of the chamber 212 allow a portion of the deflected propellant gases to exit the primary gas expansion chamber 212 and enter a blast suppression chamber 220. In an embodiment illustrated in FIG. 5, the primary gas expansion chamber 212 includes six vents 216. In other embodiments, however, any number of vents 216 may be disposed in the primary gas expansion chamber 212, without limitation.

As shown in FIGS. 3 and 4, the blast suppression chamber 220 is disposed between a tapered blast deflector 224 and a portion of the back end member 200 that surrounds the lateral gas expansion chamber 204. A rear portion of the blast suppression chamber 220 exits into a rear-most portion of the annular gas expansion chamber 172. Thus, the deflected propellant gases are caused to travel around the tapered blast deflector 224 before entering the annular gas expansion chamber 172 and exiting through the peripheral vents 136, as described herein.

Figure 7:
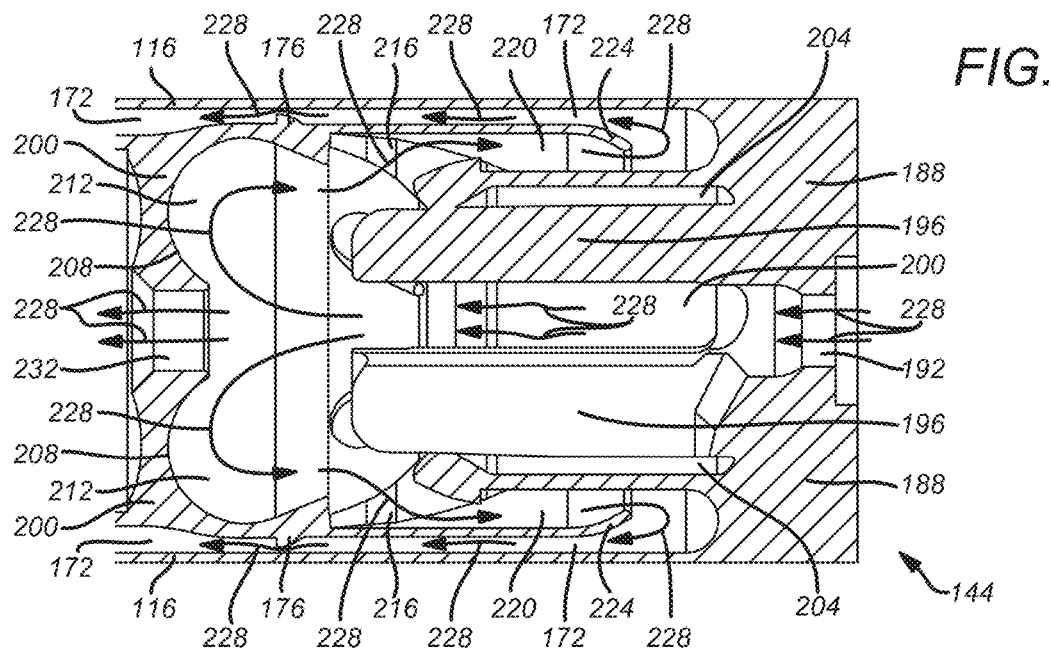
FIG. 7 illustrates an exemplary path followed by propellant gases traveling through the rear portion of the suppressor, according to the present disclosure.

FIG. 7 illustrates an exemplary path 228 followed by propellant gases traveling through the rear portion 144 of the suppressor 100, according to the present disclosure. As disclosure hereinabove, a portion of propellant gases accompanying a fired bullet is deflected rearward by the curved surfaces 208 of the primary gas expansion chamber 212. The deflected portion of propellant gases pass through the vents 216 and enter the blast suppression chamber 220. Upon passing around the tapered blast deflector 224, the deflected portion of propellant gases enter the annular gas expansion chamber 172 and are pushed distally into the forward portion 140 of the suppressor 100. As disclosed herein, the deflected portion of propellant gases may mix with propellant gases passing through the circumferential apertures 124 before exiting the suppressor 100 by way of the peripheral vents 136. It is contemplated that the rebounding of the propellant gases and their interaction among the chambers 204, 212, and 220 of the rear portion 144 continues with consequent energy attenuation, and with the propellant gases including the energy attenuated gases proceeding through a central aperture 232 and into the front portion 140 of the suppressor 100 to interact with the baffles 152 with resulting overall sound suppression efficiency.

Figure 8:
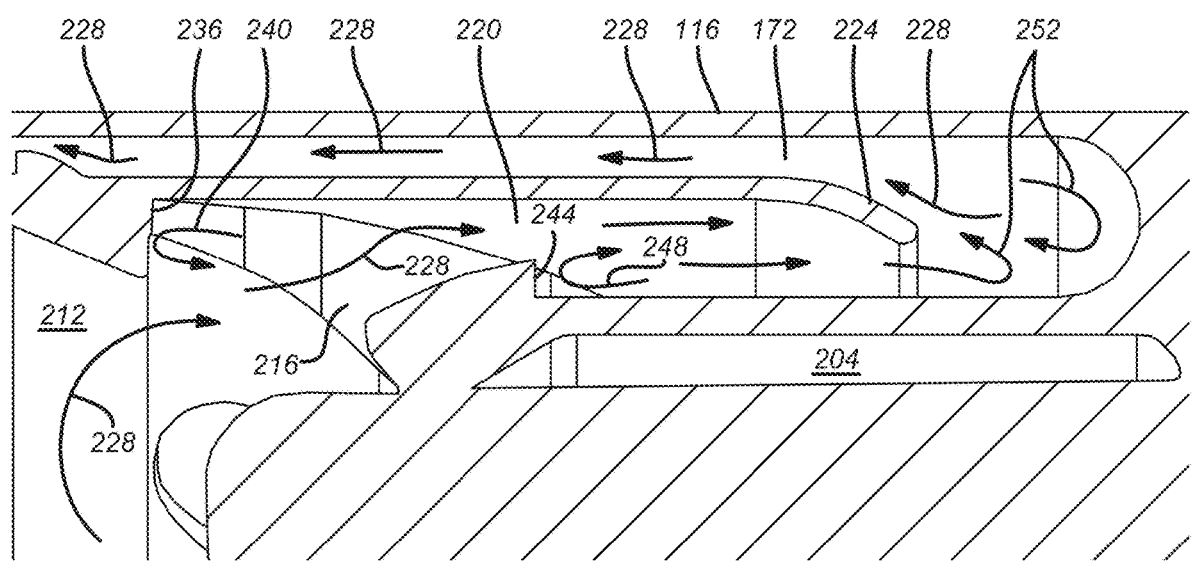
FIG. 8 illustrates an exemplary path followed by propellant gases traveling from a primary gas expansion chamber through a blast suppression chamber, around a tapered blast deflector, and into an annular gas expansion chamber.

FIG. 8 illustrates an exemplary path 228 followed by propellant gases traveling from the primary gas expansion chamber 212, through the blast suppression chamber 220, around the tapered blast deflector 224, and into the annular gas expansion chamber 172. As shown in FIG. 8, the primary gas expansion chamber 212 includes a ledge 236 that offers little resistance to propellant gases flowing into the blast suppression chamber 220 but relatively greater resistance to propellant gases flowing back into the primary gas expansion chamber 212. Consequently, the ledge 236 deflects any back-flowing gases 240 toward the blast suppression chamber 220. Similarly, the blast suppression chamber 220 includes a ledge 244 that deflects any back-flowing gases 248 toward the tapered blast deflector 224. Further, the tapered blast deflector 224 serves to direct any back-flowing gases 252 into the annular gas expansion chamber 172. As will be appreciated, therefore, the ledges 236, 244 and the tapered blast deflector 224 serve to keep the propellant gases flowing into the annular gas expansion chamber 172 before ultimately exiting the suppressor 100 through the peripheral vents 136, as described herein.

Methods for providing suppressors that exhibit relatively minimal muzzle flash and muzzle blast, such as the suppressor 100, include identifying types, causes, and a predictive model of flash behavior. Experimental analysis using computation fluid dynamics (CFD) to express the performance of the suppressor 100 in terms of sound and back-pressure has enabled creating a model of flash performance that may be used to analyze the flash performance of existing and proposed suppressor configurations, as described herein.

As will be appreciated, suppressor flash performance is chiefly driven by a combination of primary combustion, secondary combustion, and tertiary combustion. Primary combustion comprises a normal function of a firearm where powder is burnt in combination with its internally contained oxidizers within the barrel. For example, in short barrels, the combustion gas is still burning at the muzzle but is believed to be limited by powder composition (e.g., no additional free oxygen available in the plume). Secondary combustion arises due to combustion gas mixing with ambient air inside the suppressor. For example, when the combustion gas expands through the suppressor the resulting turbulence and oxygen availability allows for an additional combustion event that adds energy to the system. Tertiary combustion occurs due to combustion gas mixing with ambient air outside the suppressor. More specifically, when the combustion gas expands into the ambient environment, if the flow conditions allow for enough mixing and there is sufficient energy for ignition, then there is a possibility for an additional unconstrained combustion event.

Empirical testing has demonstrated that suppressor flash performance may be characterized by way of three general types: first-round flash, steady-state flash, and high-temperature flash. First-round flash occurs when a suppressor's internal volume is at ambient temperature and composition. It is contemplated that a presence of oxygen within the suppressor allows for unburnt powder to reach secondary combustion conditions within the suppressor. The secondary combustion causes an increase in temperature and pressure as additional combustion gas expands out of the suppressor, thereby giving rise to a visible signature on the first shot.

Steady-state flash is a typical flash behavior of a given suppressor design. Following a first shot, the visible signature is typically reduced for subsequent shots. It is contemplated that steady-state flash is produced by the primary combustion gas and the flow dynamics/shock physics in the absence of additional combustion events.

High-temperature flash occurs in some suppressor configurations when a certain threshold temperature is reached. As such, high-temperature flash is a design specific phenomenon that is thought to be driven by turbulent mixing of combustion gas with the ambient environment. In suppressor configurations wherein a cohesive shielding plume is absent, the gas mixture achieves a combustible composition but only begins to exhibit an explosive flash behavior when the system reaches a high enough energy to ignite the mix.

Figure 9A:
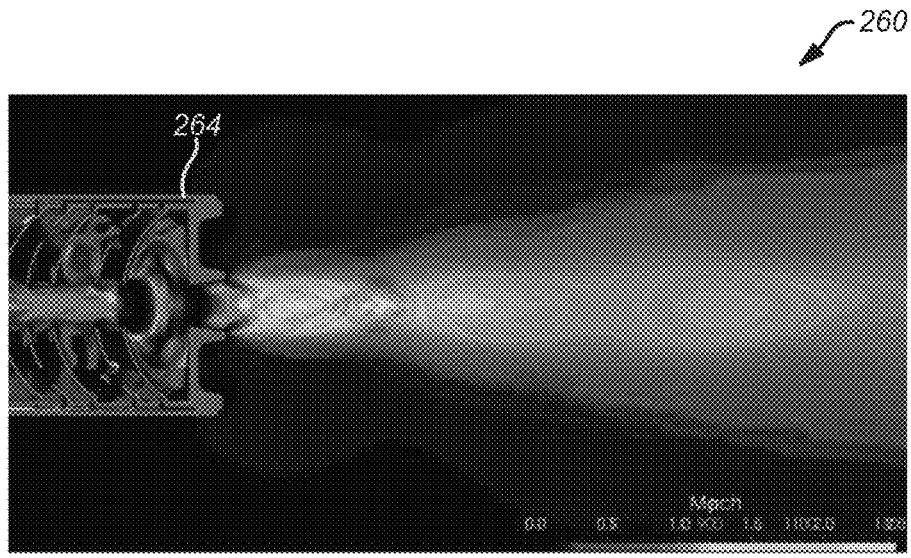
FIG. 9A shows a composite image of flash exiting an exemplary embodiment of a suppressor.
Figure 9B:
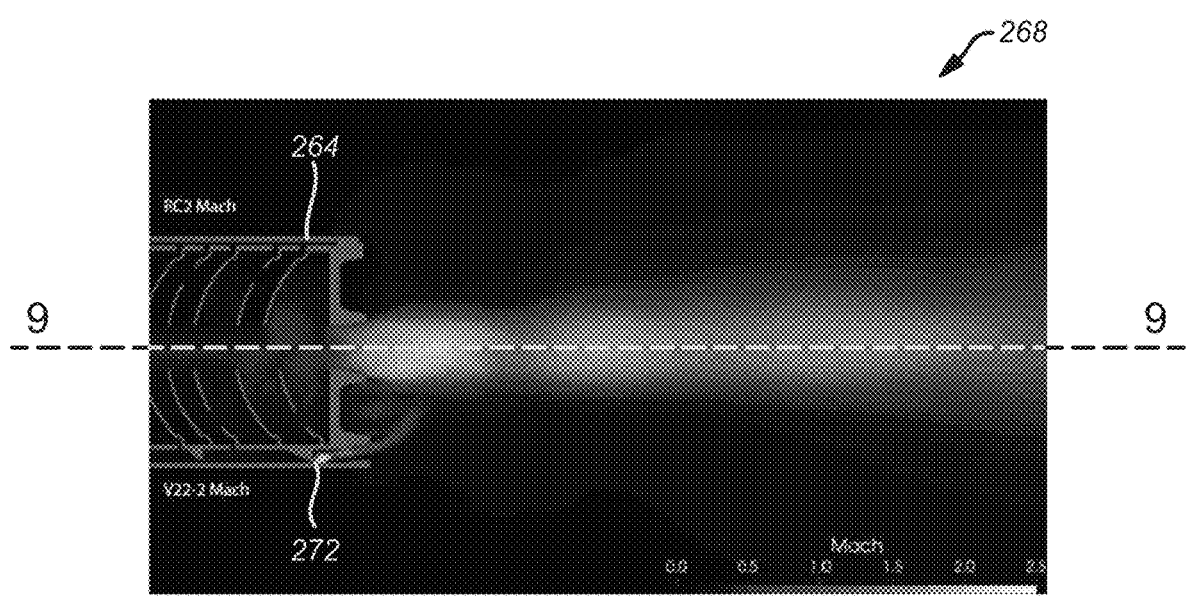
FIG. 9B shows a Mach time-average comparison of the flash exiting a first exemplary embodiment of suppressor, shown above line 9-9, and the flash exiting a second exemplary embodiment of a suppressor, shown below line 9-9.

In some embodiments, methods for creating a model of flash performance that may be used to analyze the performance of existing and proposed suppressor configurations includes developing a CFD-based predictive model by comparing composite and time-average imagery with flash photography of the same suppressor configuration. For example, FIG. 9A shows a composite image 260 of flash exiting an exemplary embodiment of a suppressor 264. FIG. 9B shows a Mach time-average comparison 268 of the flash exiting the suppressor 264, shown above line 9-9, and the flash exiting a second exemplary embodiment of a suppressor 272 shown below line 9-9. In some embodiments, methods of analysis include comparing empirically collected data to simulated data for a suppressor configuration that is representative of the geometry used throughout a suppressor design family so as to create an algorithm that takes a simulated performance as an input and produces an empirical result as an output. Such an algorithm can then be applied to proposed suppressor configurations to produce predictions of their real-world performance.

Figure 10:
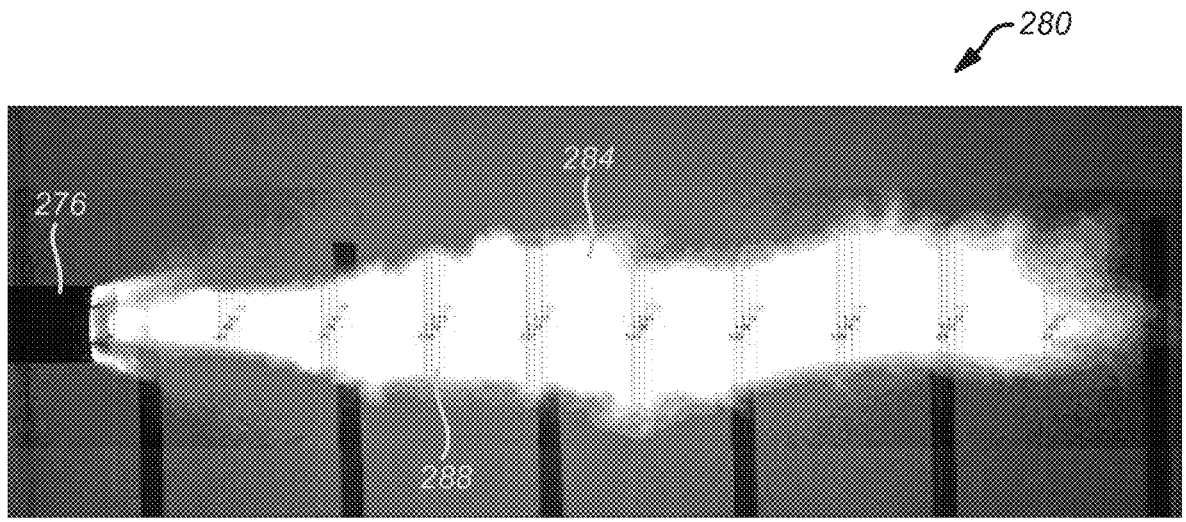
FIG. 10 shows a time lapse image of a flash plume that is taken for a first round fired through a cold suppressor.

In an embodiment, shown in FIG. 10, empirical data may be obtained for a suppressor 276 having a configuration of interest. As shown in FIG. 10, a time lapse image 280 of a flash plume 284 is taken for the first-round fired through a cold suppressor 276. The time lapse image 280 is then posterized in an image processing software to create 4 levels 288 of plume intensity. As shown in FIG. 10, the width of each plume level 288 is taken at an even interval of distance. It is contemplated that first-round flash corresponds to a Mach level threshold that increases with distance from an exit bore of the suppressor 276. As such, the minimum Mach required to create a visible plume increases as distance from the suppressor increases (hereinafter, referred to as "x").

Figure 11:
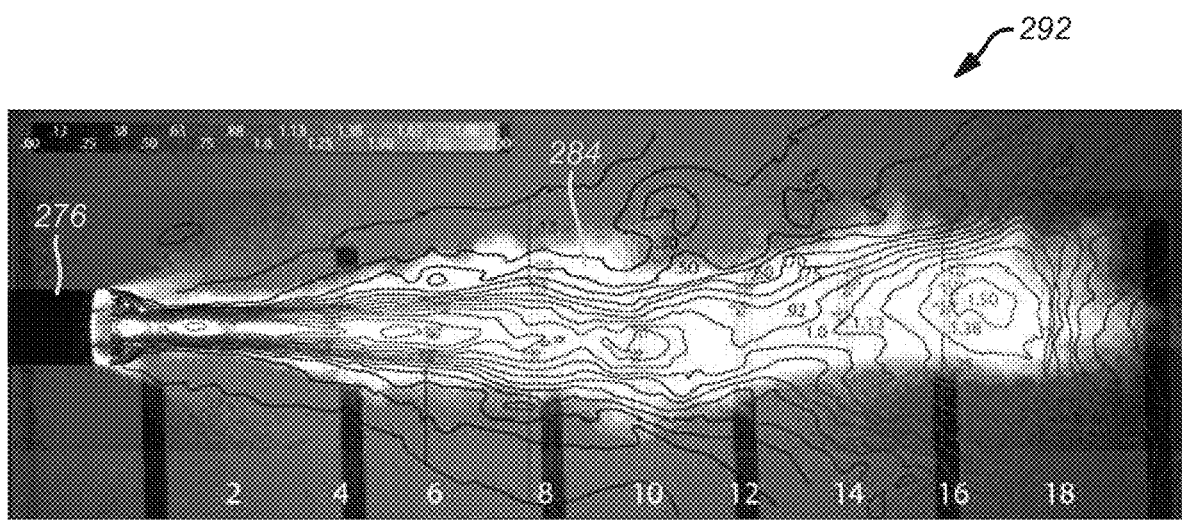
FIG. 11 shows the flash plume of FIG. 10 after being subjected to a computational fluid dynamics simulation.

FIG. 11 shows the suppressor 276 and the flash plume 284 of FIG. 10 subjected to a 2-dimensional CFD simulation 292 within COFFE using conditions derived from a model of combustion existing within ALE3D4I. While it is not thought that the specific programs are germane to the present disclosure, their respective feature sets are important aspects of why each was used for its purpose. The output of this time accurate simulation is time-averaged to create images of dRho, temperature, and Mach Number that comprise the basis of the methods of analysis presented herein.

Figure 12:
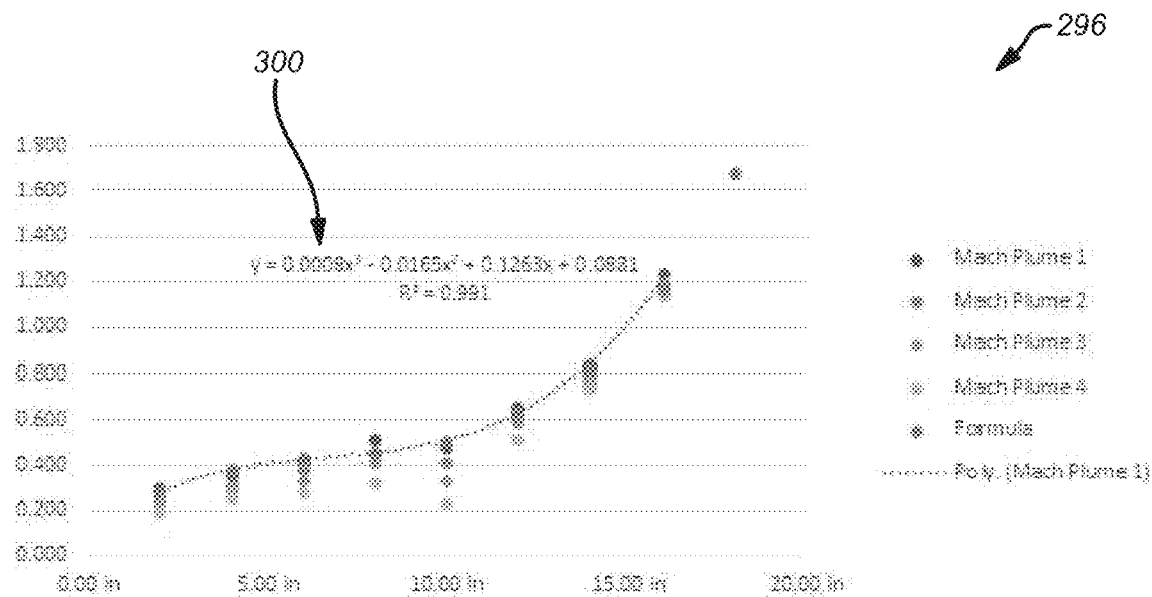
FIG. 12 is a plot of Mach Number as a function of distance from an exemplary embodiment of a suppressor.

Mach Number is particularly suitable for analyzing first-round flash. The Mach time-average comparison 268 shown in FIG. 9B shows levels defining regions of similar Mach Number. In an embodiment, a y-axis width at each x-value may be determined for each of the regions of similar Mach Number. Next, the Mach Number for the width above and the Mach Number for the width below the width of the flash plume 284 shown in the flash image, FIG. 10, may be used to derive the Mach Number that corresponds to the width of the visible flash plume 284 at each distance, x. The resulting data set comprises the Mach Number from the simulation that corresponds to the actual visible flash plume boundary at each x-distance. As shown in FIG. 12, a plot 296 of the Mach Number from the simulation as a function of x-distance may be formed. The plot 296 may then be used in combination with a best fit method to determine a formula 300 that relates the Mach threshold to x-value.

Figure 13:
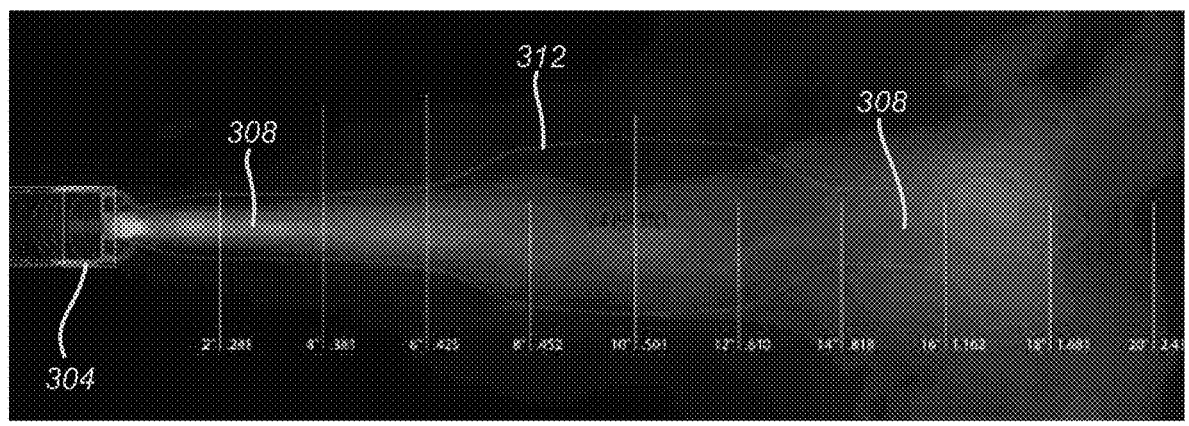
FIG. 13 is an image providing a threshold level of Mach that will produce a visible plume as a function of distance from an exemplary embodiment of a suppressor.

As will be appreciated, the formula 300 can be applied to new suppressor configurations within the same product family and condition set to predict first-round flash performance. For example, the formula 300 provides the threshold level of Mach that will produce a visible flash plume as a function of x (i.e., the white labels), as shown in FIG. 13. Simulation data from a new suppressor configuration 304 may then be analyzed and the width of the simulated Mach plume 308 that corresponds to the Mach threshold may be recorded for each x-value. An outline may then be constructed by linking the resulting widths with a smooth outline 312. It is contemplated that although the data and predicted flash plume, described herein, is chiefly concerned with the width and length of the flash plume, in some embodiments data regarding location of the flash plume surrounding the bore axis of the suppressor 304 may be further analyzed, without limitation.

Figure 14A:
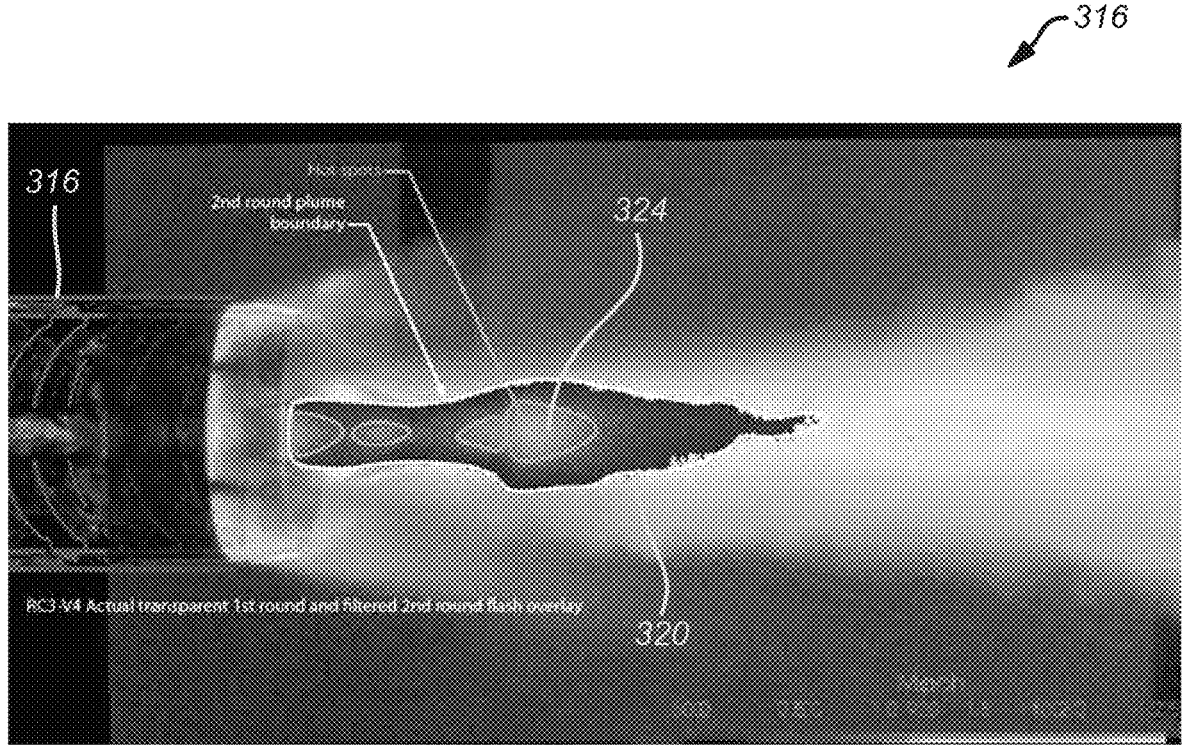
FIG. 14A is composite image showing an overlay of a first-round flash and a second-round flash by an exemplary embodiment of a suppressor.
Figure 14B:
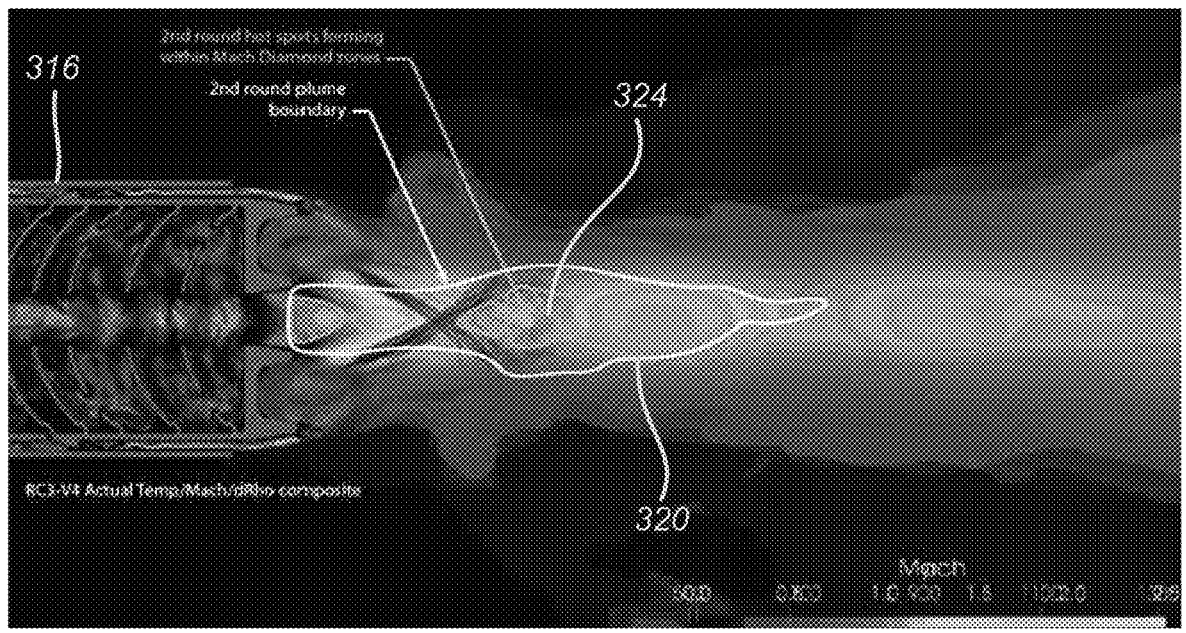
FIG. 14B is composite image showing a composite of actual Mach, temperature, and dRho time averages.

Turning, now, to FIGS. 14A-14B, in some embodiments, methods for creating a model of flash performance may be used to analyze steady-state flash of a suppressor 276 by comparing composite and time-average imagery with flash photography, as described herein. Experimentation has demonstrated that steady-state flash appears to be well correlated to aspects of simulated results. For example, in some embodiments, steady-state flash may be divided into a flash plume component and a hot spot component to generate a prediction of how this type of flash will behave. FIG. 14A shows a first-round flash and a second-round flash overlay 316 produced by the suppressor 276. As shown in FIG. 14A, a second-round plume boundary 320 and multiple hot spots 324 are indicated in the overlay 316. FIG. 14B shows a composite 328 of actual Mach, temperature, and dRho time averages. As indicated in FIG. 14B, the current model predicts that the plume 320 will follow the Mach and Temperature time averages and wrap nodes out to a distance dependent on the intensity of the nodes. Further, the hot spots 324 are predicted to be in alignment with the dRho component of the simulation and form in a manner and location of Mach Diamonds.

As described hereinabove, high-temperature flash occurs in some suppressor configurations when a certain threshold temperature is achieved. The existence of high-temperature flash is predicted in models where a discontinuity or disrupted flash plume envelope is present in the composite images. Such a disrupted flash plume envelope indicates that hot combustion gas exiting the suppressor is experiencing turbulence and mixing with the ambient environment and thus obtaining extra oxygen needed for tertiary combustion at that temperature. On the contrary, a well attached and continuous exterior flash plume suggests an absence of a tertiary combustion event. The localized turbulence contained within the exterior flash plume is predicted to give rise to a first-round flash rather than a tertiary explosion.

As will be appreciated, a difficulty in developing a more concise model for tertiary combustion due to high-temperature flash is due to a rarity and lack of repeatability of the phenomenon. It is contemplated that additional research into the behavior of combustion gas, unburnt powder, and pressure/temperature conditions within a suppressor during tertiary combustion will provide an improved background understanding of this portion of the model. It is further contemplated that, in particular, developing a two independent variable graph defining the combinations of oxygen availability and gas temperature that produce tertiary combustion will give rise to improved predictions of high-temperature flash.

Moreover, it is contemplated that the primary avenue of development of the method for predicting high-temperature flash is to increase the understanding of the thresholds and dynamics of the behavior. Primarily, with increased access to the reaction set, powder composition, combustion gas composition, and both temperature and oxygen flash points the model of high-temperature flash can be refined. Further, these variables can be post processed to outline high-temperature flash where the conditions meet the requirements for flash development at temperature. Additionally, following in Moore's law, the future ability to run nonadiabatic and active combustion simulations will allow for multi-shot simulations and secondary/tertiary combustion events to contribute energy to the system and better predict the existence and extent of high-temperature flash.

In some embodiments, methods for creating a model of flash performance that may be used to analyze the performance of existing and proposed suppressor configurations may be performed by way of an automated system. For example, in some embodiments, image analysis (e.g., in Matlab or other suitable software) of an empirical test provides a data set that may be imported into simulation post-processing software to automatically export a relationship between simulated Mach Number and empirical flash plume boundary. In some embodiments, an AI or Machine Learning approach may be included such that a greater scope and resolution of data can be analyzed. It is contemplated that such an AI or Machine Learning approach may take the form of deeper analysis of static (time average/time lapse) data where, on the empirical side, intensity, hue, contrast, and other image variable variables are considered while on the simulated side, Mach, Pressure, Temperature, Density Gradient, and other simulated variables are considered. It is contemplated that such an increased variable set will provide more detailed predictive value, perhaps allowing for a detailed shape of the flash plume or intensity to be resolved.

In some embodiments, the methods of analysis presented herein may include an addition of time domain data. In some embodiments, a relationship between empirical and simulated data may be determined and extrapolated for new suppressor configurations, as described herein, but to data sets that change in time. With an availability of highspeed, low-light video and timestep simulation data, an AI or Machine Learning approach that accounts for flash plume development over time can further resolve the predictive model to add detailed shape, location, and total energy output predictions. It is envisioned that such automated methods may facilitate applying the methods of analysis presented herein to other experiments of interest, such as ammunition choice, or variations in propellant composition and additives, without limitation.

While the suppressor and methods have been described in terms of particular variations and illustrative figures, those of ordinary skill in the art will recognize that the suppressor is not limited to the variations or figures described. In addition, where methods and steps described above indicate certain events occurring in certain order, those of ordinary skill in the art will recognize that the ordering of certain steps may be modified and that such modifications are in accordance with the variations of the suppressor. Additionally, certain of the steps may be performed concurrently in a parallel process when possible, as well as performed sequentially as described above. To the extent there are variations of the suppressor, which are within the spirit of the disclosure or equivalent to the suppressor found in the claims, it is the intent that this patent will cover those variations as well. Therefore, the present disclosure is to be understood as not limited by the specific embodiments described herein, but only by scope of the appended claims.

What is claimed is:

1. A method for developing proposed suppressors that couple with firearms to reduce muzzle blast and muzzle flash from actual firing, comprising:
   identifying causes of the muzzle flash;
   categorizing types of muzzle flash exhibited by a suppressor;
   developing a model of flash behavior;
   wherein developing the model further includes developing a computation fluid dynamics-based predictive model by comparing composite and time-average imagery with flash photography of the suppressor; and comparing empirically collected data to simulated data from the computation fluid dynamics-based predictive model for the suppressor to create an algorithm that produces predicted flash performance; and
   applying the model to a proposed suppressor by inputting simulation results from the computation fluid dynamics-based predictive model for the proposed suppressor into the algorithm to produce predicted flash performance for the proposed suppressor without actual firing the firearms.

2. The method of claim 1, wherein identifying the causes of the muzzle flash includes identifying a combination of primary combustion, secondary combustion, and tertiary combustion as driving flash performance of the suppressor.

3. The method of claim 1, wherein categorizing the types of muzzle flash includes demonstrating suppressor flash performance as comprising any one of first-round flash, steady-state flash, and high-temperature flash.

4. The method of claim 1, wherein developing the model includes dividing a flash plume into a plume component and a hot spot component to generate a prediction of steady-state flash performance of the suppressor.

5. The method of claim 1, wherein applying the model includes applying a formula that relates Mach Threshold as a function of distance from the suppressor to the proposed suppressor configurations to predict flash performance.

6. The method of claim 1, wherein developing the model includes collecting empirical data pertaining to suppressor flash performance.

7. The method of claim 6, wherein collecting includes taking a time lapse image of a flash plume for a first round fired through the suppressor in a cold state.

8. The method of claim 7, wherein collecting includes posterizing the time lapse image in an image processing software and creating two or more levels of plume intensity at even intervals of distance.

9. The method of claim 8, wherein collecting includes subjecting the time lapse image to a computation fluid dynamics-based simulation using conditions derived from a model of combustion.

10. The method of claim 9, wherein subjecting includes time-averaging the simulation to create images of any one or more of dRho, temperature, and Mach Number.

11. The method of claim 10, wherein collecting includes using the simulation to derive a y-axis width at each x-value for each region of similar Mach Number.

12. The method of claim 11, wherein developing the model includes applying the simulation to the time lapse image of the flash plume to derive the Mach Number that corresponds to the width of the visible plume as a function of distance from the suppressor.

13. The method of claim 12, wherein applying the simulation includes obtaining a resultant data set comprising the Mach Number from the simulation that corresponds to the actual visible plume boundary as a function of distance from the suppressor.

14. The method of claim 13, wherein developing the model includes using the resultant data set to determine a formula that expresses Mach Threshold as a function of distance from the suppressor.

15. A method for developing a proposed suppressor that couples with a firearm to reduce muzzle blast and muzzle flash from actual firing, comprising:

collecting empirical data pertaining to existing suppressor flash performance;

developing a model of the existing suppressor flash performance;

wherein developing the model further includes developing a computation fluid dynamics-based predictive model by comparing composite and time-average imagery with flash photography of the existing suppressor; and comparing empirically collected data to simulated data from the computation fluid dynamics-based predictive model for the existing suppressor to derive a formula that expresses Mach Threshold as a function of distance from the existing suppressor;

applying the model to the proposed suppressor to predicted suppressor flash performance;

altering the configuration of the proposed suppressor to minimize the predicted suppressor flash performance without actual firing the firearm; and assembling the actual proposed suppressor having a minimized predicted suppressor flash performance based on the alteration.

\* \* \* \* \*